United States Patent
Masumoto et al.

[19]

[11] Patent Number: 6,118,831
[45] Date of Patent: *Sep. 12, 2000

[54] DATA DEMODULATOR DEVICE

[75] Inventors: Takahiko Masumoto, Gunma-ken; Kazuhiro Kimura, Fukaya; Hiroshi Kaneko, Gunma-ken, all of Japan

[73] Assignee: Sanyo Electric Co., Ltd., Osaka, Japan

[*] Notice: This patent is subject to a terminal disclaimer.

[21] Appl. No.: 08/840,970

[22] Filed: Apr. 21, 1997

[30] Foreign Application Priority Data

Apr. 22, 1996 [JP] Japan ................................ 8-100367

[51] Int. Cl.[7] .................................................. H04L 27/06
[52] U.S. Cl. ........................... 375/340; 375/324; 329/304
[58] Field of Search .................................... 375/340, 342, 375/324, 329, 330; 329/304, 310

[56] References Cited

U.S. PATENT DOCUMENTS 5,436,591  7/1995  Henze ........................................ 375/324
5,777,511  7/1998  Masumoto et al. ...................... 375/324

FOREIGN PATENT DOCUMENTS

8-037543  2/1996  Japan .
8037545   2/1996  Japan .
8331115  12/1996  Japan .

Primary Examiner—Temesghen Ghebretinsae
Attorney, Agent, or Firm—Hogan & Hartson LLP

[57] ABSTRACT

An RDS signal is binarized by a comparator (2) and the output is sampled by a regeneration clock in synchronism with a regeneration carrier to provide sampled data. Then, by means of an accumulator (an adder 6 and a D-FF7) or a low pass filter (12), an integration result of the sampled output is obtained for each biphase symbol and by means of a biphase decoder circuit (9), the integration results are subjected to a subtraction between two symbols making up a pair. A differentially coded RDS data can be obtained using the sign of the subtraction result, which is differentially decoded in a differential decoder circuit (11) to provide an RDS data. In addition, the absolute value of the subtraction result is compared with a predetermined threshold value to provide reliability data for each differentially coded RDS data using the comparison result. The lower one of the consecutive reliability data may be assumed to be the reliability data for the RDS data.

19 Claims, 8 Drawing Sheets

DATA DEMODULATOR DEVICE

BACKGROUND OF THE INVENTION

1. Field of the Invention

The present invention relates to a device for demodulating digital data included in RDS (Radio Data System) broadcast signals or FM (Frequency Modulated) multiplex broadcast signals and, in particular, relates to the generation of reliability data required for performing soft decision error corrections on demodulated data.

2. Description of the Prior Art

In general, a received signal contains substantial noise components due to the influence of phasing and so on occurring over transmission lines, which may make it impossible for a demodulator to accurately decide whether the received signal is 1 or 0. Conventionally, by means of comparison with a suitable threshold value, the decision as to 0 or 1 has been made for demodulation so that the signal may be input to subsequent synchronous regenerator or error correction circuits. The accuracy of a receiver system may be improved by outputting data representing the reliability of a demodulated digital signal (hereinafter referred to as reliability data) anew in accordance with the level of a received signal and using such reliability data for error corrections and so on at subsequent stages. A related art for such a soft decision error correction scheme has been proposed by the Applicant in Japanese Patent Application No. Hei 7-134511.

However, such soft decision error corrections have not been made in conventional RDS decoders. A common method for generating reliability data has been performed as described below.

Figure 1:
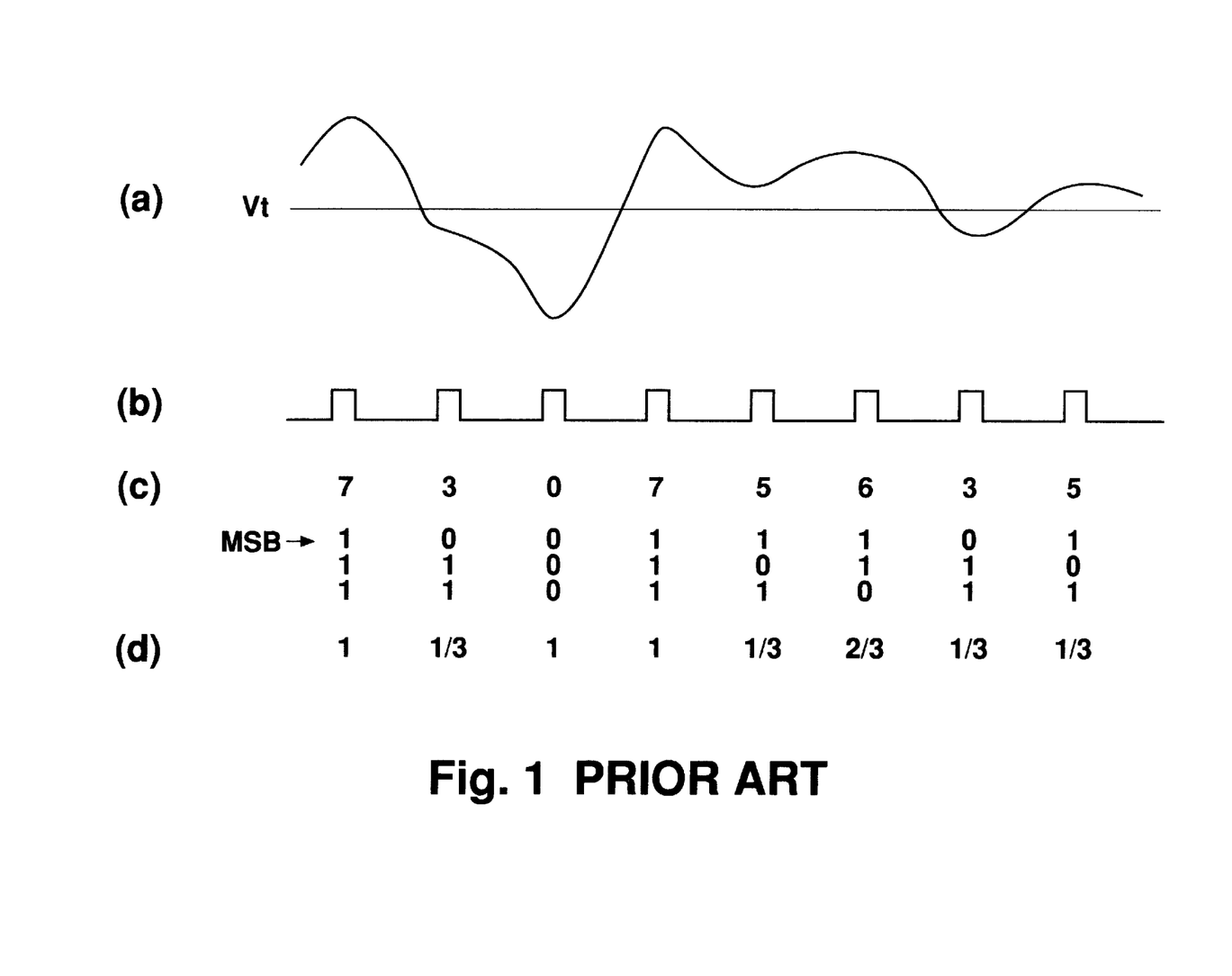
FIG. 1 illustrates a prior art method of generating reliability data in a conventional digital signal processing device.

For an input signal having multiplexed digital information ((a) in FIG. 1), a sampling pulse (b) is regenerated by a clock regenerator circuit in synchronism with the data, and the input signal (a) is sampled on the basis of the sampling pulse (b) and thereby converted to digital data (A/D conversion) (Refer to (c)). Conventional data (that is, hard decision data) is determined according to whether an input signal level is higher or lower than a threshold level Vt at a sampling timing and the MSB of the A/D conversion applies as it is. On the other hand, the reliability data for soft decision error correction is determined according to whether the distance of the input signal waveform at the sampling timing from the threshold level Vt is large or small. It means that the reliability data will be larger (higher reliability) if the input signal is far away from Vt at the sampling timing, and will be smaller (lower reliability) if it is closer to it. An example of reliability data thus determined will be shown in (d).

For an RDS decoder, the above input signal (a) would correspond to BPSK (Binary Phase Shift Keying) demodulated output of an RDS signal extracted from a FM composite signal through a band pass filter (BPF). As will be described with reference to FIG. 2, in the absence of an ARI (Automatic Radio Information) signal, an RDS signal will have a waveform as shown in (a) and the signal (a) will be demodulated by a carrier signal (b) carrier regenerated in a demodulator. Although, for illustrative purposes, a signal having six carriers per symbol is shown here, there are actually 24 carriers in an RDS.

Figure 2:
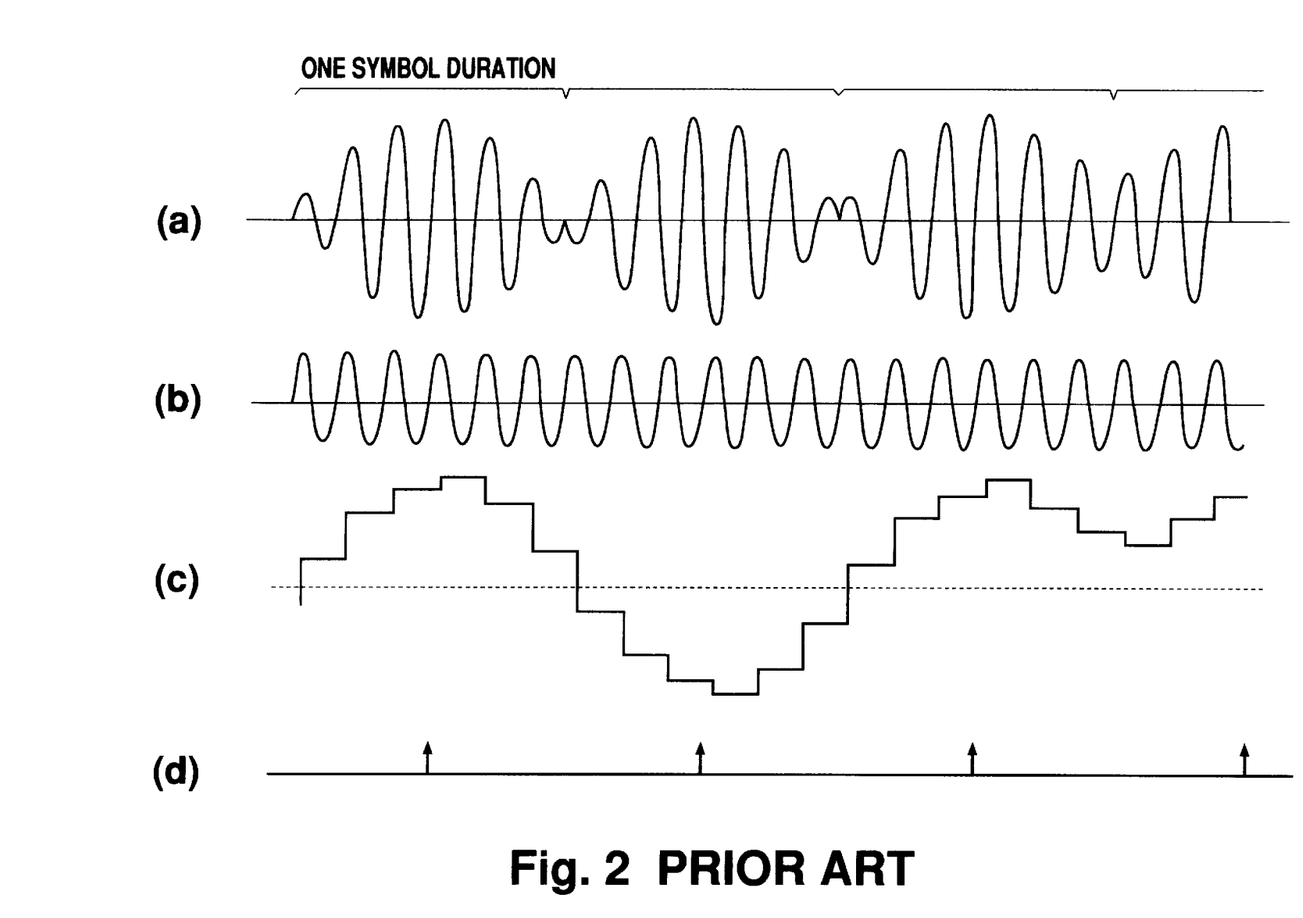
FIG. 2 illustrates a prior art method of generating reliability data in an RDS demodulator.

When the input signal (a) is A/D converted at a 90 degree phase of each cycle of the carrier (b) for example, the signal will be converted to digital data (c). By detecting the biphase timing as shown in (d) (which corresponds to (b) in FIG. 1) using a data clock regenerator circuit and using the value of the digital data (c) at this timing, the 0/1 decision of the received data (hard decision) and the detection of the reliability data may be made.

As described above, in order to acquire the reliability data, it is necessary to decide the waveform level of the input signal and, in order to know the waveform level of the input signal at a symbol data sampling timing, it is necessary to perform an A/D conversion. For this reason, when an input signal level varies due to a weak electric field and so on, such level variance will be directly reflected in the reliability data. To avoid this, it has been essential to perform an accurate AGC operation, with a result that the circuit disadvantageously tends to be more complicated. Especially for an RDS signal, this problem is more serious because when an ARI signal is multiplexed, the amplitude of an RDS/ARI multiplex signal may vary about five-fold at maximum depending on the modulation factor of the ARI signal.

Again for an RDS signal, RDS source data has been differentially coded and the differentially coded data has been coded into a biphase symbol. Such a biphase symbol represents data by a set of two symbols. For example, even if one of the symbols failed to be decoded correctly, but the other was decoded with a high reliability, it would be possible to regenerate the data correctly as long as the pair of the biphase is decided correctly. If hard decision data and reliability are to be determined for each symbol as in the conventional, however, this feature of the biphase code may not be actively utilized.

SUMMARY OF THE INVENTION

According to the present invention, a signal whose predetermined carrier has been modulated by a digital data is sampled by a clock signal in synchronism with the carrier to make a preliminary decision as to 0 or 1, the sampled data is integrated over a single symbol duration and then the integration result over the single symbol duration is compared with an optionally set threshold value to make a determination as to the symbol data and the reliability data for soft decision error correction of the symbol data.

Alternatively, the sampled data may be input through a low pass filter having a pass band consisting at least of a symbol rate and the output level of the filter at a symbol data regenerating timing may be compared with an optionally set threshold value to make a determination as to the symbol data and the reliability data for soft decision error correction of the symbol data.

According to the present invention, a modulated signal to be input is to be processed as one bit data by sampling in synchronism with a regenerator carrier, instead of by an A/D conversion. As such, the input signal can be processed regardless of the amplitude of the signal, with a benefit of achieving a simple circuit structure requiring no complicated AGC controls.

In addition, the sampled data is to be integrated over a single symbol duration to acquire the reliability data depending on the integration result, with a result of achieving high precision reliability data depending on noise components.

Especially in a demodulator for RDS signals, a subtraction is performed between the integration results of two symbols making up a biphase pair or between the outputs of a low pass filter to make a determination as to a differentially coded RDS data (hard decision data) depending on whether the result is positive or negative. Moreover, the absolute value of the subtraction result will be decided to assume that the data has a high reliability if the value is large or that the data has a low reliability if the value is smaller.

In this way, for RDS data, integration results of two biphase symbol data making up a pair are to be subjected to a subtraction to regenerate the data so that, even if one of the symbol data had a low reliability, the data would be regenerated with a relatively high reliability as long as the other symbol data of the pair has a high reliability.

DESCRIPTION OF THE PREFERRED EMBODIMENT

Figure 3:
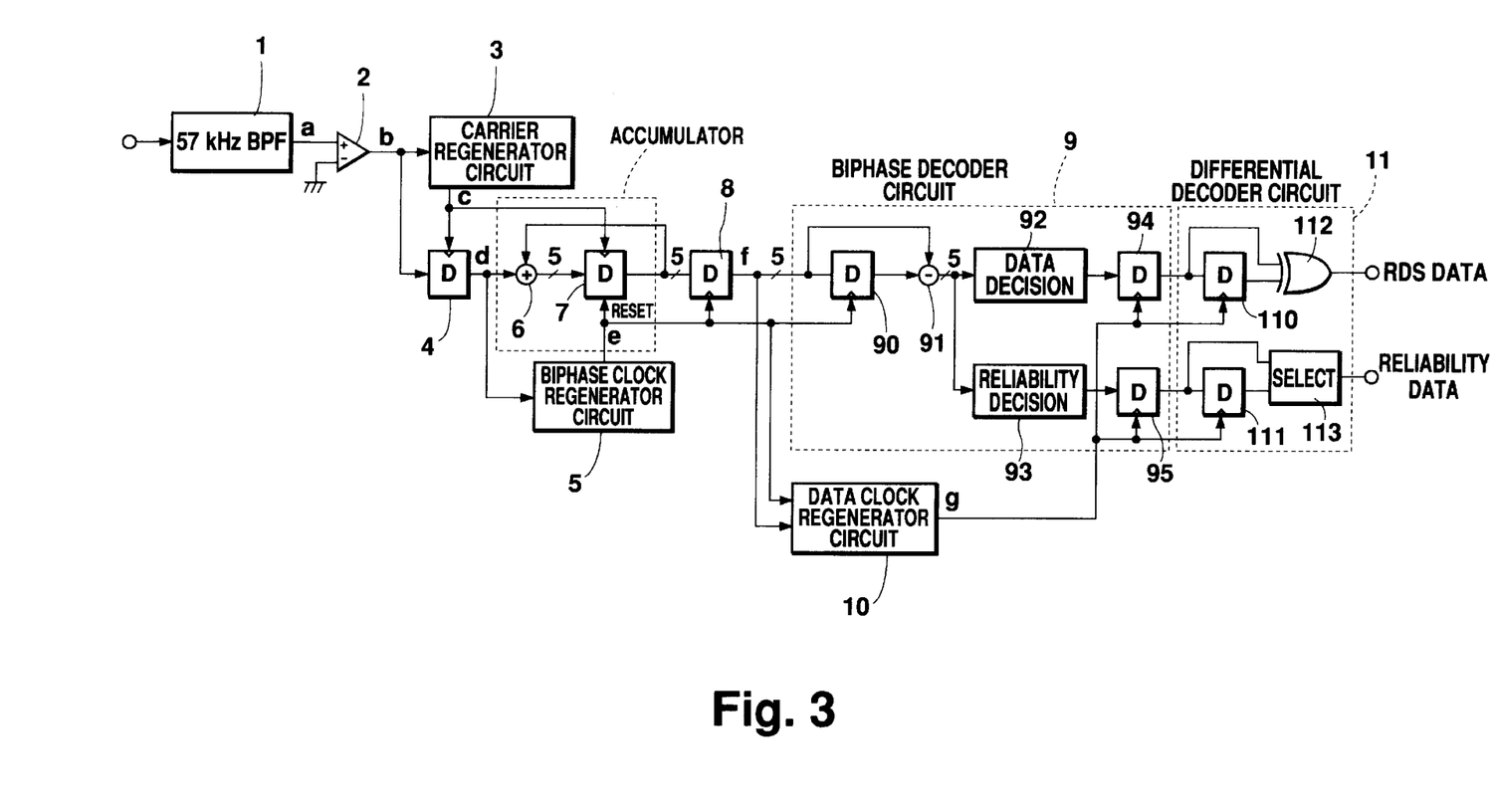
FIG. 3 is a block diagram illustrating an embodiment of the present invention.

FIG. 3 shows a block diagram of an RDS demodulator according to the present invention.

An FM composite signal multiplexed with an RDS signal is input to a 57 KHz BPF circuit 1 where the RDS signal is separated to be input to a comparator 2 where it is binarized to a digital signal of 0 or 1. The output of the comparator is then fed to a carrier regenerator circuit 3 and to a D flip flop (hereinafter referred to as D-FF) 4. The carrier regenerator circuit 3 regenerates a clock signal which is synchronized with a 57 KHz carrier and, on the basis of the regenerated clock signal, the output of the comparator will be sampled by the D-FF 4.

Figure 8:
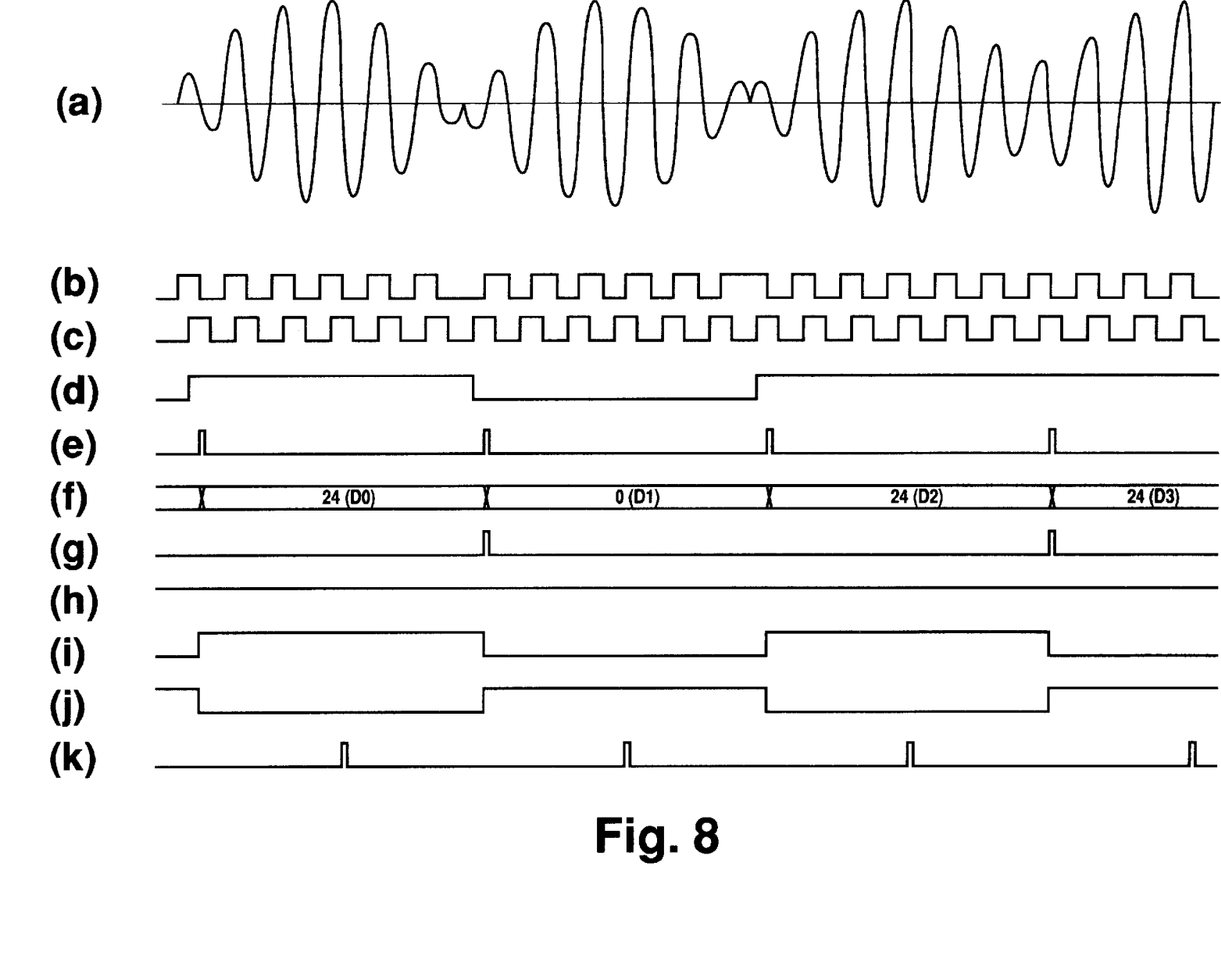
FIG. 8 is a timing chart illustrating the operation of an embodiment of the present invention.

Referring to the signal waveforms illustrated in FIG. 8, the BPF circuit 1 outputs an RDS signal as shown by (a) and the comparator 2 outputs a digital signal as shown by (b). The regenerated 57 KHz clock regenerated by the carrier regenerator circuit 3 is input as a clock signal into the D-FF 4 at a timing shown by (c) (at a 90 degree phase in relation to the carrier signal). As a result, a signal as shown by (d) will be obtained as a sampled signal from the D-FF 4 and will be fed to a biphase clock regenerator circuit 5 and an adder 6. The biphase clock regenerator circuit 5 regenerates a clock pulse (e) at a biphase symbol rate and the adder 6 sums up the output of a D-FF 7 which the output of the adder 6 is supplied, and the output (d) of the D-FF 4. Since the D-FF 7 is reset by the clock pulse (e) at the biphase symbol rate, an accumulator will be formed by the D-FF 7 and the adder 6 so that the sampled data output from the D-FF 4 may be accumulated over a single symbol duration. More specifically, the number of '1's in the sampled output data may be accumulated.

If the sampled data is an ideal one, since 24 carrier signals are input in a single symbol duration in the case of an RDS signal, the integration value of the adder must be 24 or 0 (in this embodiment, 6 or 0). The accumulation result will be latched in a D-FF 8 by the clock pulse (e) at the biphase symbol rate to be fed to a biphase decoder circuit 9 and a data clock regenerator circuit 10.

The biphase decoder circuit 9 comprises a D-FF 90 which latches the output of the D-FF 8 by the clock pulse (e) at the biphase symbol rate and a subtracter circuit 91 which subtracts the output of the D-FF 8 from the output data of the D-FF 90. They perform a subtraction between neighboring biphase symbol data to produce a differentially coded RDS data as a result of the subtraction. The differentially coded RDS data will then be input to a data judgment circuit 92 and a reliability judgment circuit 93. In the data judgment circuit 92, 0 being a threshold value, the differentially coded RDS data will be assigned 1 if the subtraction turns out to be positive and assigned 0 if it turns out to be negative (hard decision). If an ideal, noiseless RDS signal has been input, the differentiation result at the biphase decoder circuit 9 will then be 24−0=+24 or 0−24=−24. However, under the influence of noise and so on, the differentiation result could be a value closer to 0. For this reason, in the reliability judgment circuit 93, a threshold value being ±5 for example, if this differentiation result falls within an range from −5 to +5, it will be judged that the differentially coded RDS data (hard decision data) which has been decoded has a low reliability to set the reliability data at 0, and if the result does not fall within the previous range, the reliability data will be set at 1 (reliability decision). This exemplifies a case in which the reliability data comprises one bit. However, it is possible by using multiple bits of reliability data to code as described below. When the absolute value of the differentiation result is greater, the results are coded to show greater reliability data, that is, the results are coded to show greater reliability data in order as the reliability of the differentially coded RDS data are greater. When the absolute value of the differentiation result is smaller, the results are coded to show smaller reliability data, that is, the results are coded to show the smaller reliability data in order as the reliability of the differentially coded RDS data is smaller.

Also in the data judgment circuit 92, if it is only to be decided whether the differentiation result is positive or negative as described above, it will only be necessary to pass through the sign bit of the subtracter circuit 91 unmodified as a data decision result.

The data clock regenerator circuit 10 makes a decision as to the pair of biphase symbol data on the basis of the output from the D-FF 8, separates the clock from the biphase clock (e) for each symbol at a timing of alternate symbols of the pair, and then outputs the clock as a data clock (g) to D-FF's 94 and 95 and a differentiation decoder circuit 11. Thus, the differentially coded RDS data which has been biphase decoded and its reliability data will be latched from the two biphase symbol data making up a pair into the D-FF's 94 and 95.

The differentially coded RDS data and its reliability data thus obtained will then be input to the differentiation decoder circuit 11 to be decoded by a D-FF 110 and an EXOR circuit 112 into RDS source data of consecutive differentially coded RDS data. In the meantime, the lower one of the reliability data corresponding to the consecutive differentially coded RDS data will be selected and output as a reliability data corresponding to the output RDS source data. The output RDS data and the reliability data will then be fed to a synchronous regenerator circuit and an error correction circuit on the subsequent stage, to be subjected in the error correction circuit to soft decision error correction on the basis of the reliability data.

According to the embodiment as described above, the data regenerator circuit for regenerating RDS data on the basis of the accumulation result (f) is composed of a D-FF 90, a subtracter 91, a data judgment circuit 92, a D-FF 94, a D-FF 110, and an EXOR circuit 112, while the reliability data generator circuit for generating reliability data on the basis of the accumulation result (f) is composed of a D-FF 90, a subtracter 91, a reliability judgment circuit 93, a D-FF 95, a D-FF 111, and a selector circuit 113.

According to the above embodiment, an accumulator (an adder 6 and a D-FF 7) which simply accumulates sampled data for a single symbol duration is utilized for obtaining the accumulation result of sampled output. However, a low pass filter may be used instead for the same effect.

Figure 4:
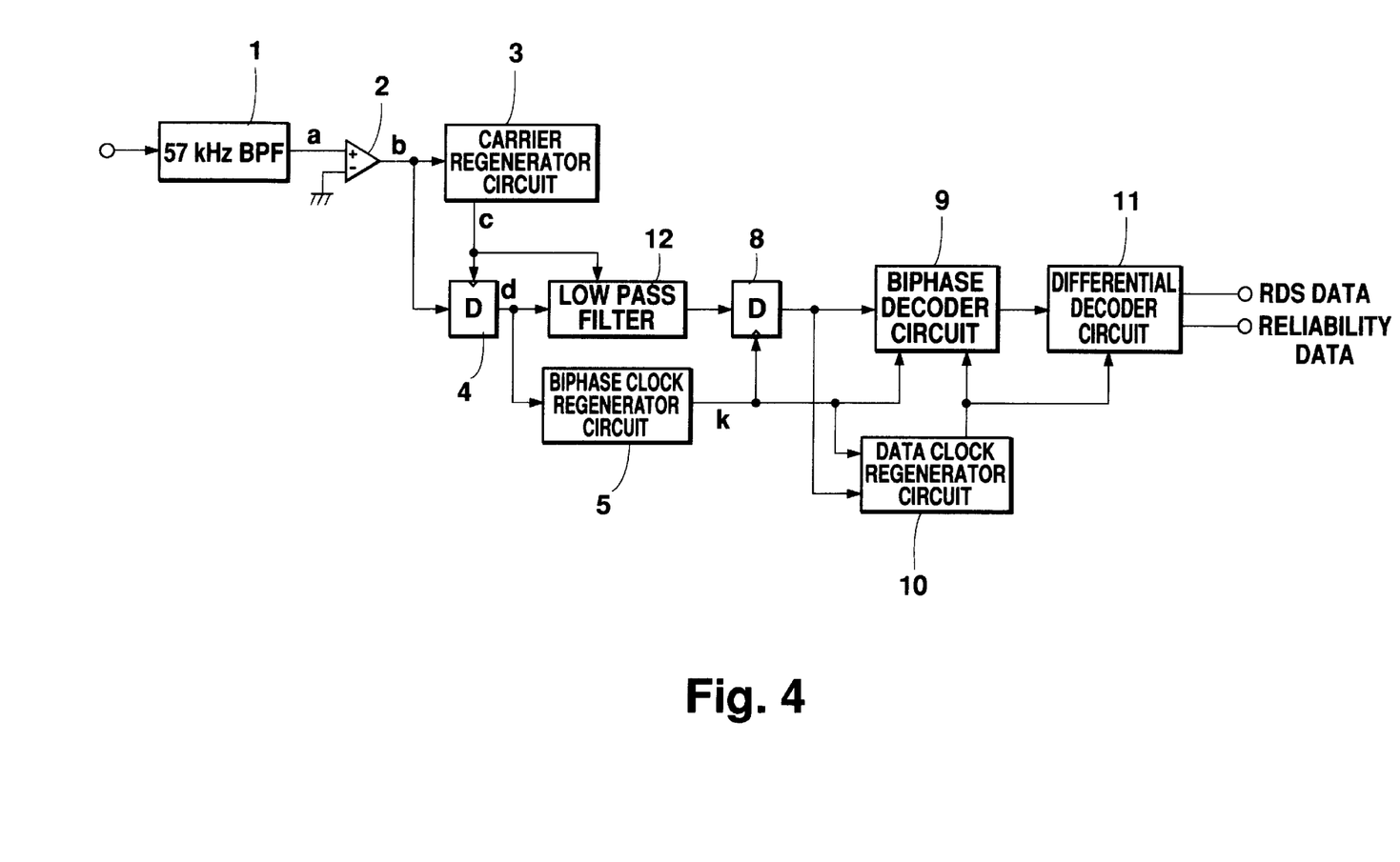
FIG. 4 is a block diagram illustrating another embodiment of the present invention.

Specifically, as shown in FIG. 4, in substitution for the adder 6 and the D-FF 7, a digital low pass filter 12 having a pass band of 2.375 KHz which is the RDS biphase symbol rate may be provided, to which the sampled output from the D-FF 4 is fed. In addition, in the biphase clock regenerator circuit 5, as shown at (k) in FIG. 8, a clock is generated at a biphase symbol rate at approximately the midpoint in each single symbol duration, and the biphase clock (k) is applied to a clock terminal of the D-FF 8 to cause the D-FF 8 to latch the output of the digital low pass filter. If, as the latched output of the D-FF 8, levels at or below the decimal places obtained by the filter operation are also output, multiple bits will be obtained as the output. Specifically, if an input signal is an ideal, noiseless signal, an output of 1.00 or 0.00 will be obtained for the latched output, while if the waveform is distorted due to noise and so on, an output closer to 0.50 will be obtained. This latched output will then be fed to the biphase decoder circuit 9 and the data clock regenerator circuit 10 as in the aforementioned embodiment (1). In the biphase decoder circuit 9, a differential operation is performed between the biphase symbol data making up a pair, with a result that if the differentiation result turns out to be positive, the differentially coded RDS data will be 1 and if it turns out to be negative, the data will be 0. If an ideal, noiseless RDS signal has been input, the differentiation result will be 1.00−0.00=+1 or 0.00−1.00=−1, whereas if the signal contained any noise components, the result will be a value closer to 0. As such, when this differentiation result is within a range from −0.3 to +0.3, for example, the differentially coded RDS data which has been decoded will be judged low in reliability to set the reliability data at 0, and if it results in a value exceeding the range from −0.3 to +0.3, the reliability data will be set at 1. This exemplifies a case in which the reliability data comprises one bit. However, it is possible to code by using multiple bits of reliability data. When the absolute value of the differentiation result is greater, the results are coded to show the greater reliability data, that is, the results are coded to show the greater reliability in order as the reliability of the RDS data is greater. When the absolute value of the differentiation result is smaller, the results are coded to show the lower reliability data, that is, the results are coded to show the lower reliability data in order as the reliability of the RDS data is smaller.

The differentially coded RDS data and its reliability data thus obtained will then be input to the differentiation decoder circuit 11, which will output RDS source data and reliability data.

Figure 5:
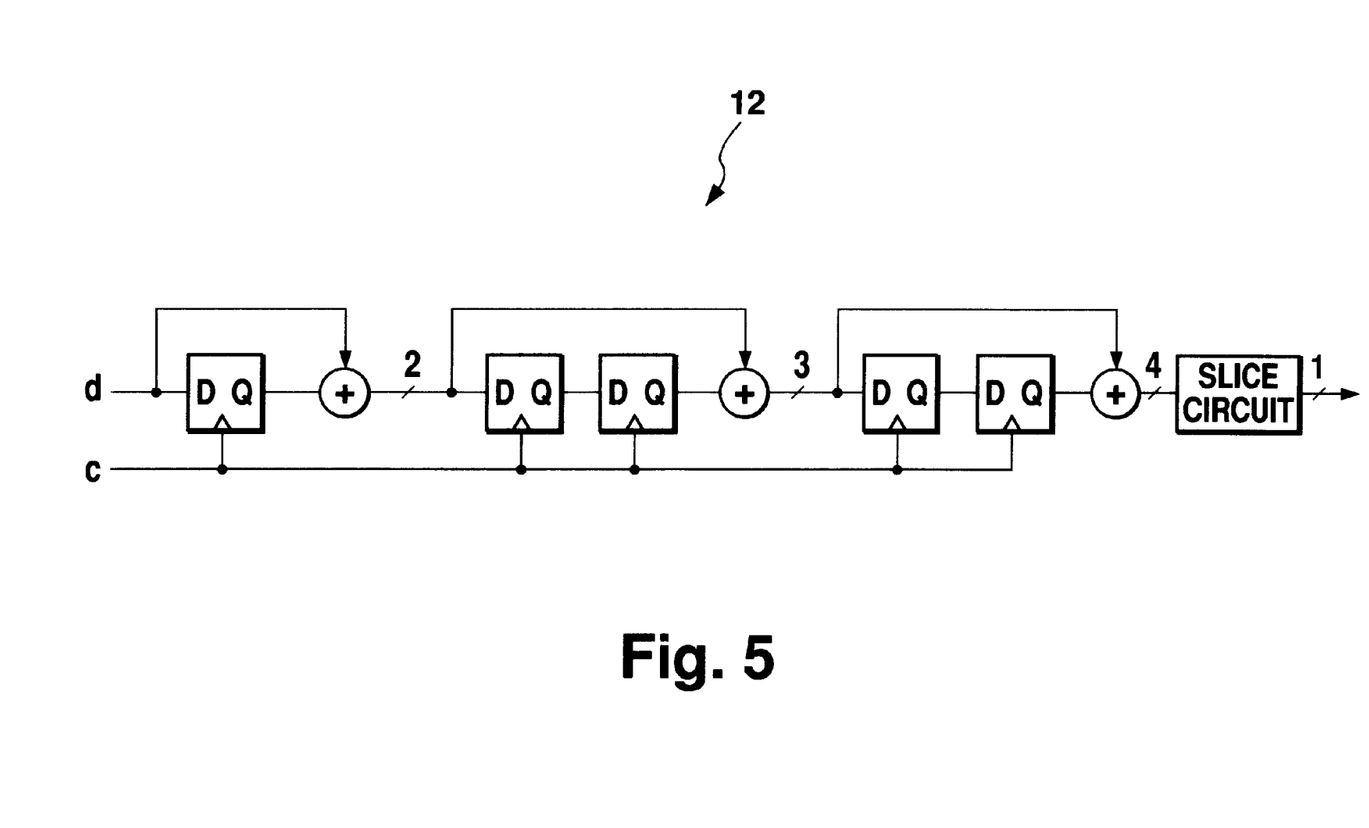
FIG. 5 is a circuit diagram illustrating an arrangement of a low pass filter.

As a digital low pass filter 12, a circuit comprising a plurality of delay circuit and a slice circuit as shown in FIG. 5, for example, may be used. The timing of latching the filter output is provided approximately at the midpoint of each single symbol duration because the filter output reaches the maximum around the midpoint. Strictly speaking, the latching timing may preferably be delayed for the delay at the filter.

Figure 6:
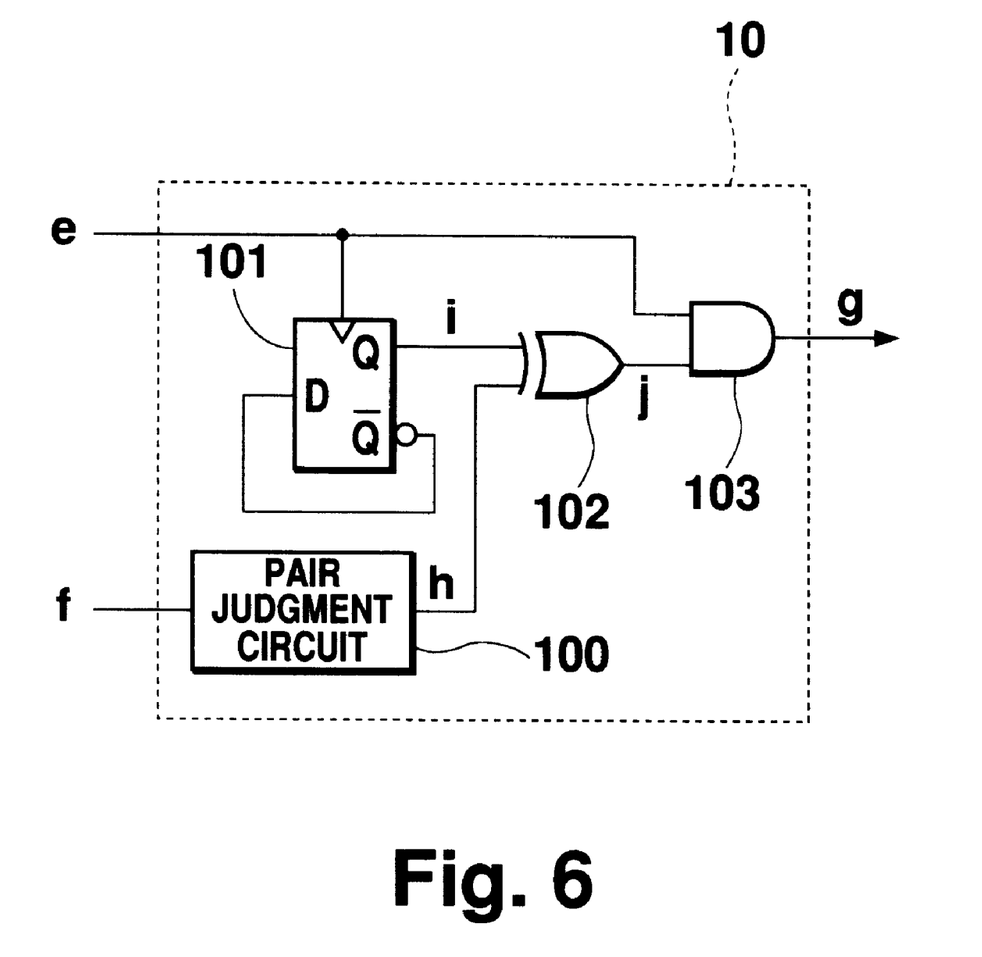
FIG. 6 is a circuit diagram illustrating an arrangement of a data clock regenerator circuit.

A configuration of the data clock regenerator circuit 10 will now be explained.

In the data clock regenerator circuit 10 as shown in FIG. 6, the output of the D-FF 8 is supplied to a pair judgment circuit 100, which decides timings making up a pair from three consecutive biphase symbol data, for example, and feeds the result of the decision into an EXOR circuit 102. Fed into the other input of the EXOR circuit 102 is a signal of the biphase clock pulse (e) which has been divided by two in a divider 101. By inputting this EXOR output into an AND circuit 103, a timing of alternate symbols making up a pair is separated from the biphase clock (e) for each symbol to output the clock as a data clock (g).

Specifically, as described with reference to the timing chart of FIG. 8, the output of the biphase clock (e) divided into two will be (i) and, when an output (h) from the pair judgment circuit 100, that is, 1 is output, an output (d) divided into two will be inverted in the EXOR circuit 102 to produce a signal (j) and the output of the AND circuit 103 will have a clock (g) output at a timing of alternate symbols making up a pair. The pair judgment circuit 100 makes a decision as to the pair of biphase symbol data on the basis of the output (f) of the D-FF 8 so that the output (h) may be level 1 when the biphase symbol data comprises the pair (D1, D2), (D3, D4) and so forth and be level 0 when it comprises the pair (D0, D1), (D2, D3) and so forth. In this example, the case of biphase symbol data being paired as (D1, D2), (D3, D4) . . . is shown.

Figure 7:
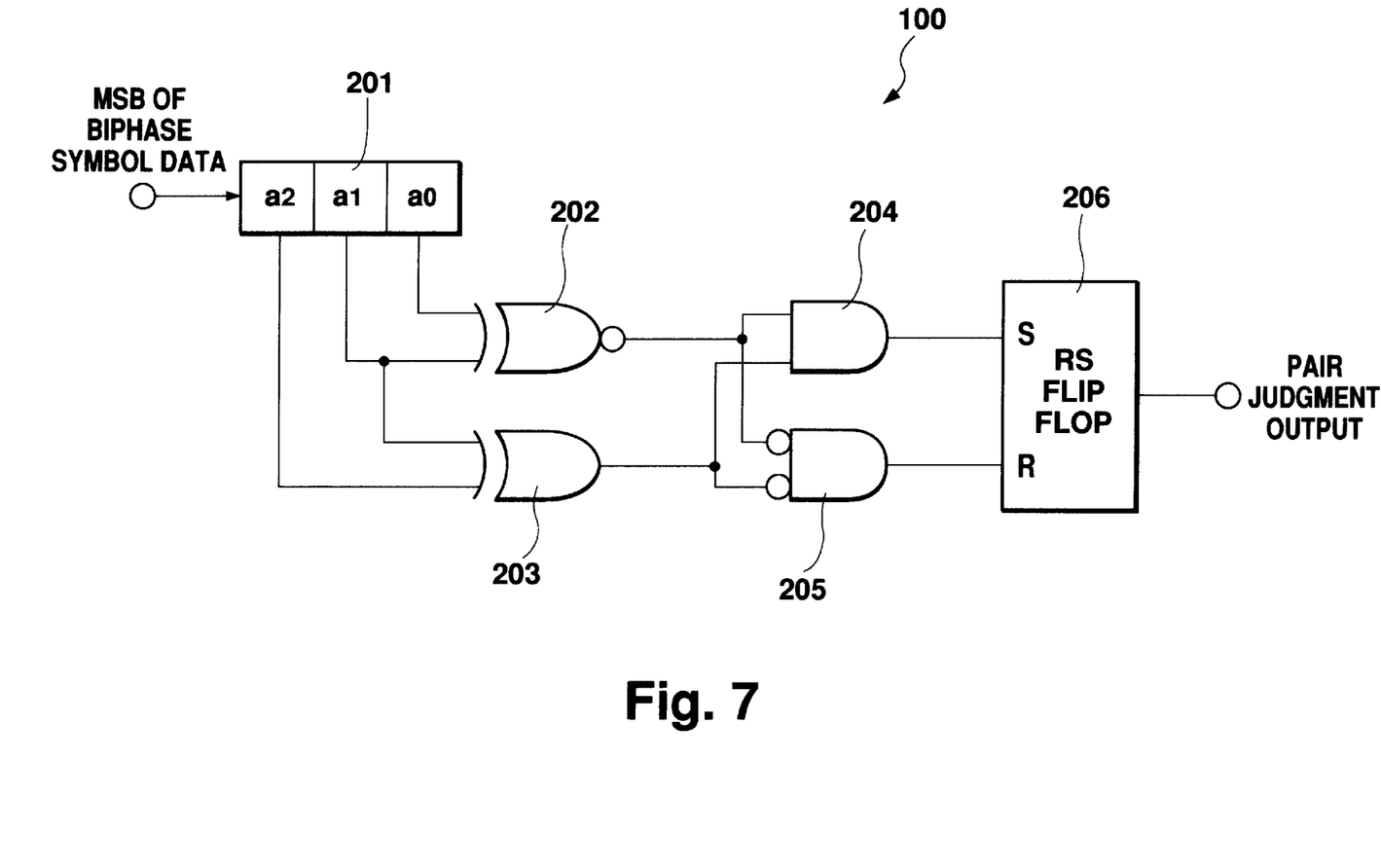
FIG. 7 is a circuit diagram illustrating an arrangement of a pair judgment circuit.

The pair judgment circuit may, for example, be composed as shown in FIG. 7. Specifically, a shift register 201 is supplied with the most significant bits MSB of sequentially input biphase symbol data. MSBs a0, a1, a2 of the three consecutive biphase symbol data D0, D1, D2 are compared by every two bits. Among the bits a0, a1 and a2 in the shift register 201, if a0 and a1 are exactly the same, the output of an EXOR circuit 202 will be 1 and if a1 and a2 are not the same, the output of an EXOR circuit 203 will be 1, thereby causing the output of an AND circuit 204 to be 1 to set an RS flip flop 206, which causes the output of this flip flop to be 1 so that D1 and D2 may be decided to make a pair. On the other hand, if a0 and a1 are not the same, the output of the EXNOR circuit 202 will be 0, and if a1 and a2 are exactly the same, the output of the EXOR circuit 203 will be 0, thereby causing the output of an NOR circuit 205 to be 1 to reset the RS flip flop 206, which causes the output of this flip flop to be 0 so that D0 and D1 may be decided to make a pair. Other implementation may be used for the pair judgment circuit 100, including the circuit arrangement as disclosed in Japanese Patent Application No. Hei 6-172682 filed earlier by the Applicant.

The regeneration of RDS data need not necessarily be made on the basis of the accumulation result. It may instead be regenerated from the sampled data itself.

While there has been described what is at present considered to be preferred embodiments of the invention, it will be understood that various modifications can be made thereto, and it is intended that the appended claims cover all such modifications as fall within the true spirit and scope of the invention.

What is claimed is:

1. A data demodulator device which demodulates a modulated signal having a predetermined carrier modulated by digital data, comprising:

a carrier regenerator circuit for regenerating a clock signal in synchronism with the frequency of the carrier;

an integrating circuit for sampling a digital modulated signal using the regenerated clock signal and integrating the sampled output;

a data regenerator circuit for regenerating the digital data according to the integration result by the integrating circuit or the sampled output; and a reliability data generator circuit for making a determination as to reliability data representing reliability of the digital data on the basis of the integration result.

2. A data demodulator device according to claim 1, wherein the integrating circuit includes an accumulator for accumulating the sampled output over a single symbol duration, and the data regenerator circuit or the reliability data generator circuit fetches the output of the accumulator as input data.

3. A data demodulator device according to claim 2, wherein the data regenerator circuit includes a comparator circuit for comparing the input data with a predetermined threshold value and makes a determination as to the digital data according to the comparison result.

4. A data demodulator device according to claim 2, wherein the reliability data generator circuit includes a comparator circuit for comparing the input data with a predetermined threshold value and makes a determination as to the reliability data according to the comparison result.

5. A data demodulator device according to claim 2, wherein the digital modulated signal is based on a digital signal whose digital data is differentially coded and biphase coded, and the data regenerator circuit and the reliability data generator circuit share a common arithmetic circuit for performing an operation on the input data of two symbols making up a biphase pair and make a determination as to the differentially coded digital data and the reliability data on the basis of the operation result from the arithmetic circuit.

6. A data demodulator device according to claim 2, wherein the digital modulated signal is a digital signal whose digital data is differentially coded and biphase coded, and the data regenerator circuit includes a subtracter circuit for performing a subtraction on the input data of two symbols making up a biphase pair and makes a determination as to the differentially coded digital data depending on the sign of the subtraction result.

7. A data demodulator device according to claim 2, wherein the digital modulated signal is a digital signal whose digital data is differentially coded and biphase coded, and the reliability data generator circuit includes a subtracter circuit for performing a subtraction on the input data of two symbols making up a biphase pair and a comparator circuit for comparing the absolute value of the subtraction result with a predetermined threshold value and making a determination as to the reliability data according the result of the comparison.

8. A data demodulator device according to claim 1, wherein the integrating circuit includes a low pass filter having a pass band of at least a symbol rate for receiving the sampled output, and the data regenerator circuit or the reliability data generator circuit fetches the output of the low pass filter as input data.

9. A data demodulator device according to claim 8, wherein the data regenerator circuit or the reliability data generator circuit fetches as input data the output of the low pass filter produced at a timing approximately at the midpoint of each symbol duration.

10. A data demodulator device according to claim 8, wherein the data regenerator circuit includes a comparator circuit for comparing the input data with a predetermined threshold value and makes a determination as to the digital data according to the comparison result.

11. A data demodulator device according to claim 8, wherein the reliability data generator circuit includes a comparator circuit for comparing the input data with a predetermined threshold value and makes a determination as to the reliability data according to the comparison result.

12. A data demodulator device according to claim 8, wherein the digital modulated signal is based on a digital signal whose digital data is differentially coded and biphase coded, and the data regenerator circuit and the reliability data generator circuit share a common arithmetic circuit for performing an operation on the input data of two symbols making up a biphase pair and make a determination as to the differentially coded digital data and the reliability data on the basis of the operation result from the arithmetic circuit.

13. A data demodulator device according to claim 8, wherein the digital modulated signal is a digital signal whose digital data is differentially coded and biphase coded, and the data regenerator circuit includes a subtracter circuit for performing a subtraction on the input data of two symbols making up a biphase pair and makes a determination as to the differentially coded digital data depending on the sign of the subtraction result.

14. A data demodulator device according to claim 8, wherein the digital modulated signal is a digital signal whose digital data is differentially coded and biphase coded, and the reliability data generator circuit includes a subtracter circuit for performing a subtraction on the input data of two symbols making up a biphase pair and a comparator circuit for comparing the absolute value of the subtraction result with a predetermined threshold value and making a determination as to the reliability data according the comparison result.

15. A data demodulator device according to claim 14, wherein the greater the absolute value of the subtraction result, the higher value the reliability data is determined to have.

16. A data demodulator device according to claim 1, wherein the digital modulated signal is a digital signal whose digital data is differentially coded and biphase coded, and the data regenerator circuit and the reliability data generator circuit share a common subtracter circuit for performing a subtraction on the input data of two symbols making up a biphase pair, said data regenerator circuit making a determination as to the differentially coded digital data depending on the sign of the subtraction result and said reliability data generator circuit further including a comparator circuit for comparing the absolute value of the subtraction result with a predetermined threshold and making a determination as to the reliability data according to the comparison result.

17. A data demodulator device according to claim 16, wherein the greater the absolute value of the subtraction result, the higher value the reliability data is determined to have.

18. A data demodulator device according to claim 1, wherein the digital modulated signal is a digital signal whose digital source data is differentially coded, the data regenerator circuit includes a differential decoder circuit for receiving two consecutive differentially coded digital data and outputting digital source data, and the reliability data generator circuit includes a circuit for selecting data indicative of the lower reliability one of the two consecutive differentially coded digital data as reliability data for the digital source data.

19. A data demodulator device according to claim 7, wherein the greater the absolute value of the subtraction result, the higher value the reliability data is determined to have.

\* \* \* \* \*